United States Patent [19]   [11] Patent Number: 5,306,994
Supino                        [45] Date of Patent: Apr. 26, 1994

[54] AUTOMATIC PHASE MARGIN COMPENSATION CONTROL CIRCUIT AND METHOD FOR DISK DRIVES

[75] Inventor: Louis Supino, Colorado Springs, Colo.

[73] Assignee: Digital Equipment Corporation, Maynard, Mass.

[21] Appl. No.: 865,994

[22] Filed: Apr. 9, 1992

[51] Int. Cl.$^5$ .............................................. G05B 13/04
[52] U.S. Cl. .................................... 318/561; 318/615; 364/151; 364/159
[58] Field of Search ........ 318/561, 560, 611, 615–618; 364/148–152, 157–159

[56]                References Cited
              U.S. PATENT DOCUMENTS

| | | | |
|---|---|---|---|
| 3,808,486 | 4/1974 | Cuda et al. | 318/620 |
| 3,900,823 | 8/1975 | Sokal et al. | 330/149 |
| 4,310,877 | 1/1982 | Richard | 364/159 |
| 5,155,422 | 10/1992 | Sidman et al. | 318/611 X |

Primary Examiner—William M. Shoop, Jr.
Assistant Examiner—Brian Sircus
Attorney, Agent, or Firm—Arnold, White & Durkee

[57]                  ABSTRACT

A control circuit optimizes the track seeking operation of a disk drive by automatically adjusting the phase margin of a compensator circuit that generates a control signal used to drive the actuator of the disk drive to optimize the actual performance of the drive during track seeking operations. Parametric values of coefficients associated with the compensation circuit used for driving the head of the disk drive are adjusted responsive to the determination of the system phase margin to change the phase margin and bring it within a desired range. More specifically, the present invention provides a method and apparatus for automatically controlling the phase margin in a compensation control circuit for a disk drive having a head driven by an actuator. The head is driven with a control signal that is generated by a compensator circuit. Feedback from the head is employed to create a position signal, which is used to generate a position error signal. The position error signal is combined with a disturbance signal of predetermined frequency. The resulting signal is fed into the compensator circuit, which has a transfer function that can be expressed mathematically in terms of one or more coefficients. The phase margin of the system is computed by taking the phase difference between the disturbance signal and the component of the position error signal that has the same frequency as the disturbance signal. The values of the compensator circuit coefficient are adjusted to bring the phase margin within an acceptable range.

9 Claims, 2 Drawing Sheets

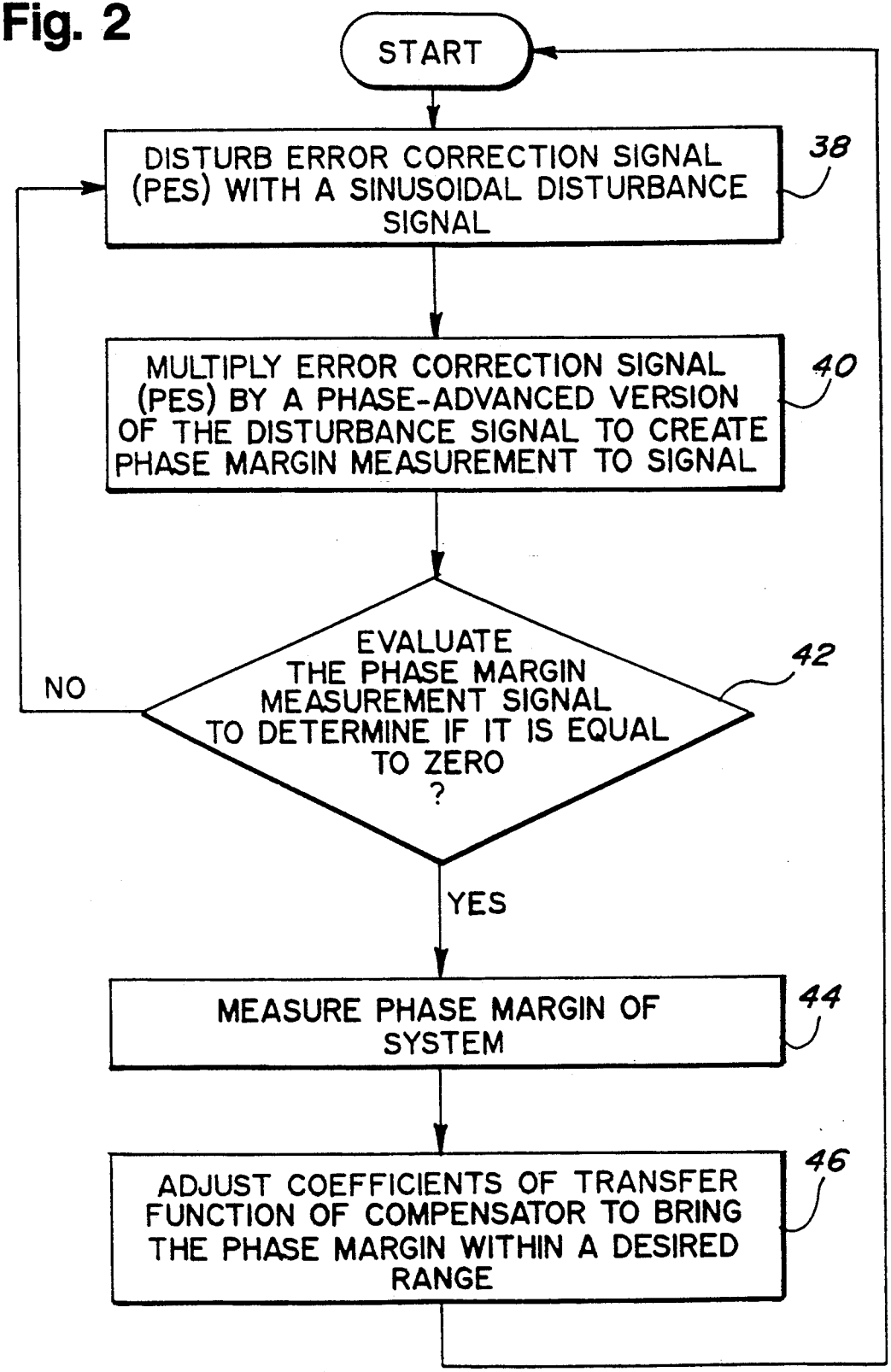

AUTOMATIC PHASE MARGIN COMPENSATION CONTROL CIRCUIT AND METHOD FOR DISK DRIVES

FIELD OF THE INVENTION

The present invention relates to optimizing track seeking operations for disk drives, and more particularly to a method and apparatus for automatically adjusting the phase margin in a servo control circuit for a disk drive to provide optimal track seeking operations.

BACKGROUND OF THE INVENTION

When a head in a disk drive is moved by its corresponding servo-controlled actuator from one disk track to another selected disk track, a servo system controls the actuator and closely monitors and controls the velocity and position of the head on the disk in real time to achieve optimal performance. For this purpose, as is well-known to one of ordinary skill in the field, position information is derived and fed back in the form of an error correction signal to a compensator circuit. The compensator circuit generates a signal that is applied to the actuator to accurately control the radial position of the head over the disk.

The operating phase margin of the servo control circuit is typically preset for large numbers of disk drives based on an assumed set of worst case conditions. However, past experience has shown that actuator friction varies from drive to drive over a large population of drives and that friction also varies with changes in operating temperature. It is well-known that as friction varies, so does the phase margin of the servo system, which directly affects the stability and performance of the disk drive over time.

Of course, when the phase margin for the servo control is set to an assumed worst case situation, individual disk drives not operating in the worst case do not receive optimal servo control information. Further, when actuator friction changes under normal operating temperature changes the preset phase margin compensation does not change which results in the inability of the servo control to optimize to actual operating conditions for a specific disk drive.

Previously known control systems for optimizing the seek performance of disk drives in real time adjust a seek velocity profile, which controls the velocity at which the actuator is driven as a function of the length of a specific seek to be performed. Such systems monitor the occurrence of head overshoots and related parameters to update the seek velocity profile. These systems do not account for the reduction in performance caused by a suboptimal phase margin.

SUMMARY OF THE INVENTION

The present invention optimizes the track seeking operation of individual disk drives by automatically adjusting the phase margin of a compensator circuit which generates a control signal. The control signal is used to drive the actuator of a disk drive and optimize the actual performance of the drive during track seeking operations. Parametric values of coefficients associated with the transfer function of the compensator circuit are adjusted in response to the determination of the phase margin. The adjustment of the compensator circuit coefficients changes the phase margin of the compensator to bring it within a desired range.

More specifically, the present invention provides a method and apparatus for automatically controlling the phase margin in a compensation control circuit for a disk drive having a head driven by an actuator. The head is driven or positioned in response to the control signal generated by the compensator circuit. Feedback from the head is used to generate a position signal, which is used to generate a position error signal. The position error signal is combined with a disturbance signal of predetermined frequency. The resulting signal is fed into the compensator circuit, which has a transfer function that can be expressed mathematically in terms of one or more coefficients. The phase margin of the system is determined by analyzing the phase difference between the disturbance signal and the component of the position error signal that has the same frequency as the disturbance signal. The values of the compensator circuit transfer function coefficient are adjusted in response to the actual phase margin of the operating disk drive system to bring the phase margin within an acceptable range.

BRIEF DESCRIPTION OF THE DRAWINGS

Other advantages of the invention will become apparent upon reading the following detailed description and upon reference to the accompanying drawings, in which:

FIG. 2 is a flow diagram illustrating a preferred method of implementing continuous phase margin compensation for a disk drive system according to the present invention.

Figure 1:
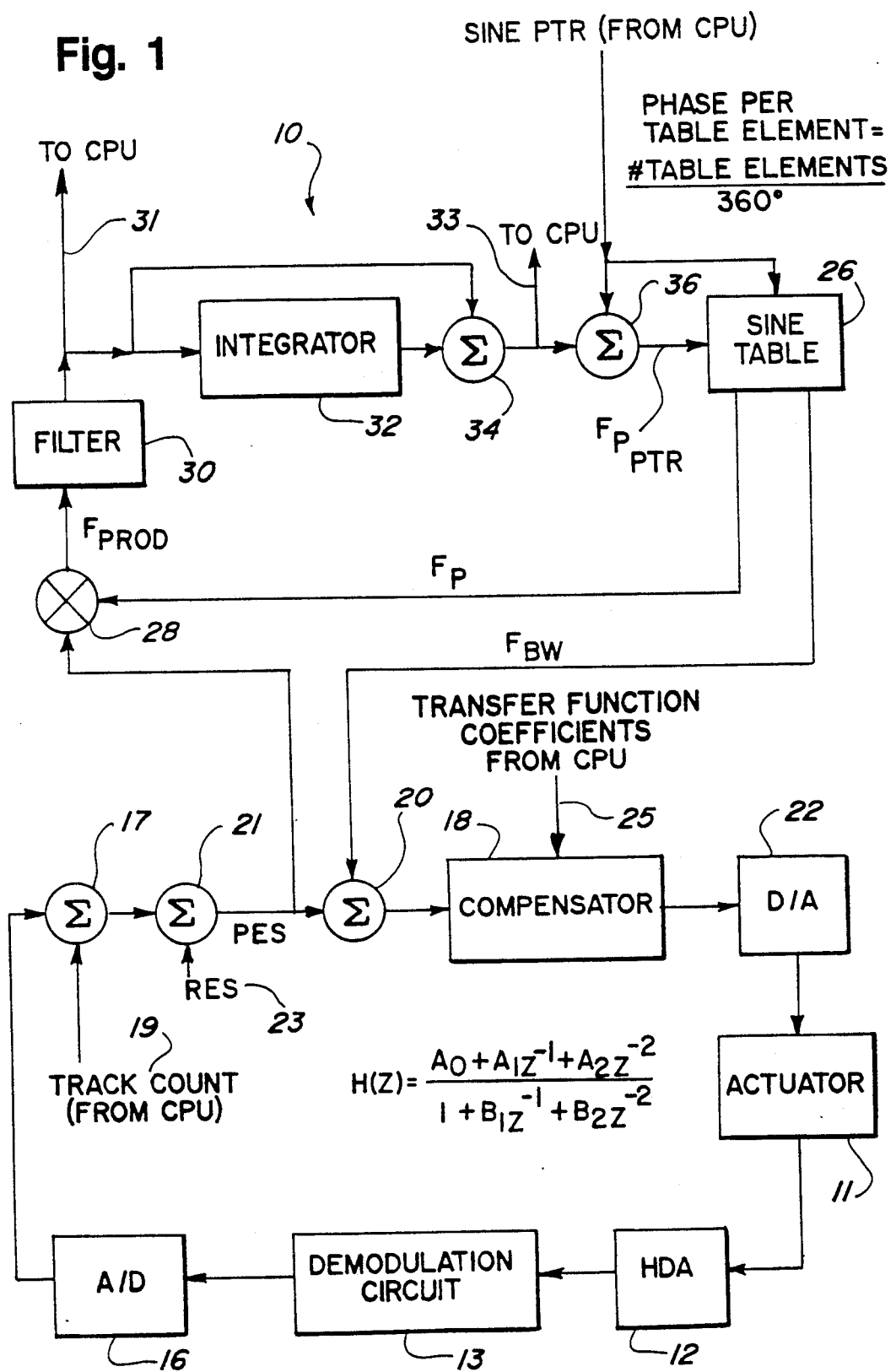
FIG. 1 is a block diagram of an automatic continuous phase margin compensation control circuit for use with an operating disk drive system according to the present invention.

While the invention is susceptible to various modifications and alternative forms, a specific embodiment thereof has been shown by way of example in the drawings and will herein be described in detail. It should be understood, however, that the invention is not intended to be limited to the particular form disclosed. On the contrary, the applicant's intention is to cover all modifications, equivalents, and alternatives falling within the spirit and scope of the invention as defined by the appended claims.

DETAILED DESCRIPTION OF THE PREFERRED EMBODIMENT

The phase margin of a disk drive control circuit has a dramatic effect on the overall performance of the disk drive. If the phase margin falls outside a desirable range of approximately 35° to 50°, the performance of the disk drive is degraded. If the phase margin is less than approximately 35°, head settling times are lengthened beyond an optimal value. On the other hand, phase margins in excess of approximately 50° result in slower than desirable system response times. The present invention provides optimization of individual disk drive performance in real time by maintaining phase margin within an acceptable range.

Referring to the drawings, FIG. 1 is a block diagram of an automatic continuous phase margin compensation control circuit 10 for use with an operating disk drive system according to the present invention. As will be apparent to those having ordinary skill in the field, the digital functions of the present invention may be implemented using hardware, software or a combination of the two. The control circuit 10 operates to drive or control an actuator 11 of a head disk assembly (HDA) 12. The actuator 11 is typically considered part of the HDA 12 but is illustrated as a separate unit for the sake of clarity. The operation of the control circuit 10 of the present invention is governed by a central processing unit (CPU) that executes a control program stored in a memory device (not shown). The operation of control programs to control disk drives is well-known to those of ordinary skill in the field. The CPU has the capability to access a memory device and perform calculations on various parameters stored therein via a control program. The control program operating the control circuit 10 must be modified in accord with the teachings of this invention in a manner that is within the scope of one of ordinary skill in the field.

As is well-known in the field, the control program that operates the control circuit of the present invention manages information about the position of the disk heads. Specifically, the control program reads track identification information on the disk and uses this information to keep track of the location of the head and to calculate optimum seek velocity of the heads during seek operations.

A feedback signal from the head of the HDA 12 in the form of an analog position signal is supplied via a demodulation circuit 13 to an analog-to-digital (A/D) convertor 16. The demodulation circuit 13 converts encoded bit patterns detected by the HDA 12 into an analog signal, which is converted into digital form by the A/D convertor 16 and fed into a summing node 17. The output of the A/D convertor 16 corresponds to the radial position of the heads of the HDA 12 over the disks within a tolerance of $+/-\frac{1}{2}$ tracks. A track counter variable 19 is provided by the control program as an input to the summing node 17. The track counter variable 19 is calculated by the control program according to well-known methods. In one such method, the control program keeps a running total of tracks crossed by the HDA 12.

The output of the summing node 17, which corresponds to the radial position of the heads of the HDA 12 over the disks, is fed into a summing node 21. The tracking information maintained by the control program allows it to generate a reference signal 23, which corresponds to the destination track of the HDA 12. The reference signal 23 is input into the summing node 21. Thus, the output of the summing node 21 is a position error signal (PES). The position error signal corresponds to the difference between the current position of the heads of the HDA 12 and their desired position or destination. The PES signal is fed into a summing node 20 along with a disturbance signal of frequency $F_{BW}$ generated from a sine table 26. The output of the summing node 20 is fed into a compensator circuit 18 of the type well-known to those of ordinary skill in the field. The compensator circuit 18 has a frequency domain transfer function H(z) of the general form:

$$H(z) = \frac{A_0 + A_1 Z^{-1} + A_2 Z^{-2}}{1 + B_1 Z^{-1} + B_2 Z^{-2}} \quad (1)$$

As will be fully described hereinafter, the coefficients A and B associated with the terms in this transfer function are established by the phase margin compensation control circuit 10 of the present invention to optimize performance of the disk drive. The output of the compensator circuit 18 is fed into a digital-to-analog (D/A) convertor 22, which converts it into an analog control signal. The output of the D/A convertor 22 can be amplified if needed to a level suitable for driving the actuator 11 associated with the HDA 12. As will be apparent to one of ordinary skill in the art, the control circuit formed by the demodulation circuit 13, the A/D convertor 16, the compensator circuit 18, the track counter variable 19, the D/A convertor 22, the reference signal 23, the summing nodes 17, 20 and 21, and the actuator 11 are well-known and accordingly not described in detail.

The sine table 26 is part of or stored in a memory device associated with the control circuit 10, as will be appreciated by those of ordinary skill in the field. The sine table 26 consists of a plurality of successive memory locations that contain data corresponding to a point on a sinusoidal waveform having a sufficiently large magnitude to produce a measurable disturbance of the PES signal. The frequency of the sine wave generated by the sine table 26 is variable under program control depending on the speed at which values are read out of the sine table 26. The phase of a sine wave with respect to a reference point is known since the address of a specific point on the sinusoid is known and each successive address location represents a fixed phase difference. For example, if the sine table 26 contains 360 entries, each successive entry differs from the preceding entry by 1°. The sine table 26 is desirably constructed to wrap around so that a waveform of indefinitely long duration can be created. For purposes of the present invention, the frequency of the sine wave generated corresponds to the operating bandwidth of the specific HDA that is being optimized by the control circuit 10. This bandwidth is designated as $F_{BW}$.

A disturbance signal having a frequency of $F_{BW}$ is generated from the sine table 26 under program control by a pointer designated as "SINE PTR" as will be understood by one of ordinary skill in the field. The value of the SINE PTR pointer corresponds to an address of one of the values stored in the sine table 26. Because any specific point of the sinusoidal disturbance signal can be called from the sine table 26 at any time, the control program can accurately control the phase of the disturbance signal with respect to other signals provided by the sine table 26. The initial value chosen for SINE PTR may be calculated or stored in memory as a default value for use by the control program. As will be apparent to one of ordinary skill in the field, the specific initial value of SINE PTR is irrelevant to the practice of the invention because the value of SINE PTR merely corresponds to a single point on a sinusoidal waveform.

In a preferred embodiment of the invention, the value of SINE PTR is an integer between 0 and 32,767 counts. This range corresponds to 360° because it represents one cycle of a sine wave. The value of SINE PTR is incremented once per interrupt cycle (for example, 20,160 times per second) of the microprocessor that runs the control program. As is readily apparent to one of ordinary skill in the art, the value of SINE PTR can be incremented by a predetermined amount when each interrupt occurs. In a preferred embodiment, the incremental value of SINE PTR is 893 counts. Thus, the value of SINE PTR increases by 893 times 20,160 counts each second (18,002,900 counts per second). The frequency $F_{BW}$ for a given embodiment can be calculated by dividing the total number of counts per second by the number of counts corresponding to the range of SINE PTR. Thus, the frequency $F_{BW}$ in a preferred embodiment of the invention is 18,002,900/32,768 or 550 Hz. The sine table 26 may contain any desired number of entries. In a preferred embodiment, the sine table 26 contains 32 entries. Since SINE PTR has 32,768 possible values, the value of the SINE PTR is divided by $2^{10}$ (1 k) and added to the initial memory address of the sine table 26 to obtain successive addresses in the sine table 26.

A sinusoidal waveform of frequency $F_{BW}$ is read out of the sine table 26 under program control and provided to the summing node 20. As previously noted, the other input to the summing node 20 is the output of the summing node 21 (PES). In addition to providing the waveform of frequency $F_{BW}$ to the summing node 20, the control program selects a point having a predetermined phase relationship with respect to the disturbance signal from the sine table 26 and causes a waveform $F_P$ of frequency $F_{BW}$ to be supplied to a multiplying node 28. The output signal of the summing node 21 (the PES signal) is also fed into the multiplying node 28. The output signal of the multiplying node 28, a phase measurement signal designated as $F_{prod}$, is supplied to an averaging filter 30. The output signal of the averaging filter 30 is supplied to an integrator 32. The output signals from the averaging filter 30 and the integrator 32 are both fed into a summing node 34. Finally, the output signal of the summing node 34 and the SINE PTR selection signal are supplied to a summing node 36, which has an output signal designated as $F_P$ PTR. As will be fully explained hereinafter, the output of the summing node 34 is used to determine the phase margin of the system. It is within the contemplation of the present invention for the output of the summing node 34 to be monitored by the control program using well-known methods. For example, if the invention is implemented with digital circuitry, the value of the output of the summing node 34 may be read into the CPU over a data bus 33 or converted into an analog voltage by an A/D convertor (not shown) for measurement by the CPU using conventional techniques. If the invention is implemented in software, the value of the summing node 34 is stored in a memory location where it can be accessed by the CPU.

The $F_P$ PTR signal is used to point at successive iterative positions in the sine table 26 so that the phase relationship between the $F_P$ signal and the disturbance signal changes with each successive iteration. As the output of the integrator 32 changes, $F_P$ PTR changes to point at successive values until the output of the averaging filter 30 goes to zero. When this occurs, enough information is known to allow the control program to determine the phase margin of the system. To do this, the control program subtracts the waveform position (phase reference) indicated by the output of the summing node 34 and the waveform position pointed to by SINE PTR to calculate the angular difference between the waveform points indicated by these two signals. As previously discussed, the phase margin can be computed from this information by the control program because each incremental value of the sine table 26 corresponds to a fixed amount of angular displacement between waveform positions.

The significance of the averaging filter 30 being driven to zero by successive iterations is rooted in well-known mathematical principles. The PES signal includes sinusoidal frequency components of various frequencies, including a component at frequency $F_{BW}$. The product of two sinusoids having different frequencies has an average value of zero, but the product of two sinusoids having the same frequency yields a measurable result. Therefore, the $F_{prod}$ signal and the output of the averaging filter 30 are proportional to the $F_{BW}$ component of the PES signal, because other components of the PES signal are zeroed out by the operation of the multiplying node 28.

Specifically, the product $F_{prod}$ of two sinusoids having phases of A and B respectively is expressed as follows:

$$F_{prod} = \sin A \cdot \sin B = 0.5[\cos(A-B) - \cos(A+B)] \quad (2)$$

To simplify the equation, let $B = A + C$ because the two sinusoids of interest, $F_{BW}$ and PES, are of the same frequency, but phase shifted by C. Thus, $$F_{prod} = 0.5 \cdot [\cos(-C) - \cos(2A+C)] \quad (3)$$

Further, if A is defined to be the phase of the disturbance signal and C is defined to be the phase of $F_P$ relative to A, two values of C would cause the value of $F_{prod}$ to equal zero. These two frequencies are separated by 180°, but only the one of these values that is phase advanced by 90° compared to the disturbance signal is stable. Thus, if C is defined to be 90°, $$F_{prod} = 0.5 \cdot \sin 2A \quad (4)$$

Under these conditions, $F_{prod}$ has an average value of zero. Therefore, it is known that when the output of the averaging filter 30 is zero, $F_P$ is advanced 90° with respect to the disturbance signal. Thus, the phase margin of the system is determined when the output of the averaging filter 30 is zero because the phase relationship between $F_{prod}$ and the disturbance signal is known at this point.

It is within the contemplation of the present invention for the output of the averaging filter 30 to be monitored by the control program using well-known methods. For example, if the invention is implemented with digital circuitry, the value of the output of the filter 30 may be read into the CPU over a data bus 31 or converted into an analog voltage by an A/D convertor (not shown) for measurement by the CPU using conventional techniques. If the invention is implemented in software, the value of the averaging filter 30 is stored in a memory location where it can be accessed by the CPU. It is additionally within the contemplation of the present invention for the control program to delay measurement of the phase margin for a predetermined period of time, after which it is assumed that the output of the averaging filter 30 is sufficiently close to zero to allow an accurate determination of the phase margin to be made.

After the phase margin is determined, the operating coefficients of the transfer function associated with the compensator circuit 18 are adjusted to change the phase margin, bringing it within a desired range. If the invention is implemented as a hardware circuit, the coefficients of the compensator are determined by the values of electronic components (for example, programmable resistor networks) associated with the compensator circuit. As will be apparent to one of ordinary skill in the field, the phase margin of the hardware compensator circuit can be altered by employing the control program to change the values of selected compensator circuit components, such as the values of resistors in programmable resistor networks. In the hardware embodiment, control information is passed to the compensator circuit 18 via a data bus 25 from the CPU. This information is used to set the value of components, thereby setting the value of the coefficients associated with the compensator circuit 18. The use of control programs to alter the value of components in compensator circuits is well-known.

In a software embodiment of the present invention, the coefficients are stored in memory where they can be altered by the control program. When the control program determines the appropriate value for a given coefficient, the value is stored in a memory location corresponding to that coefficient. Coefficient values are generated by the control program based on empirical observations of a plurality of HDAs and how the phase margins of the compensator circuits of the observed HDAs change as the coefficients are changed. By quantifying the coefficient values that correspond to various phase margins, a mathematical formula that relates each coefficient (for example, all $A_2$s, all $A_1$s, etc.) in terms of phase margin is derived. Thus, equations may be developed that predict a combination of coefficients necessary to change the phase margin of the compensator 18 to a known level.

The methods used to derive these equations are, of course, commonly known. One example of such a method is the least squares method of curve fitting. A mathematical expression for each coefficient is derived by curve fitting empirically measured coefficients for a population of HDAs. As will be apparent to one of ordinary skill in the art, the accuracy of the mathematical representations of the coefficients is directly proportional to the size of the population of empirically measured HDAs.

As an example, assume that we wish to generate mathematical expressions for compensator circuit coefficients based on observations of five compensator circuits having a phase lead or lag ranging from $-20°$ to $20°$ and are gain normalized at frequency $F_{BW}$. It is necessary to curve fit each of the transfer function coefficients (i.e., all $A_2$s, $A_1$s and $A_0$s, etc.) in order to have a first or second order equation which represents the A coefficients in terms of phase. Thus, if the five exemplary compensator circuits have the following $A_0$ coefficients:

| $A_0$ coefficients | Phase |
| --- | --- |
| 1.0 | $-20°$ |
| 0.9768 | $-10°$ |
| 0.9496 | $0°$ |
| 0.9284 | $10°$ |
| 0.9034 | $20°$ | the least squares curve fit results in the following values for the A0 coefficients of the five compensator circuits:

$$A0 = -0.0024x + 0.9513 \quad (5)$$

where x is a desired phase adjustment value, which corresponds to the difference between the desired phase margin of the system and its actual phase margin. This equation is implemented by the control program to alter the value of the A0 coefficient of the HDA 12 being controlled to produce any desired phase margin. When equations for all coefficients are computed in this manner and stored in memory by the control program, the phase margin of the compensator circuit 18 will approximate the value associated therewith.

FIG. 2 is a flow diagram illustrating a preferred method of implementing continuous phase margin compensation for a disk drive according to the present invention. At step 38, the control program selects a predetermined phase value for the disturbance signal from the sine table 26 using the SINE PTR index pointer. A phase offset signal $F_P$ is also generated from the look-up sine table 26 and multiplied by the PES signal to yield the phase margin measurement signal $F_{prod}$ signal at step 40. As previously noted, the control circuit 10 of the present invention iteratively selects successive values corresponding to a phase difference between the disturbance signal and $F_{prod}$ to cause the value of the phase margin measurement signal to go to zero. Thus, the average value of the phase margin measurement signal is determined and the phase relationship between the disturbance signal and $F_{prod}$ is iteratively modified based on the value $F_P$ PTR until the average value of $F_{prod}$ is zero. In this manner, successive values of phase difference are offset relative to the initial value of SINE PTR based on the effect a given phase difference has on the performance of the control circuit 10, as manifested by the output signal from the summing node 34. Stated another way, successive values of phase difference between the disturbance signal and $F_{prod}$ are pointed to in the sine table 26 according to the value of the output signal of the summing node 34 + SINE PTR.

When the output of the averaging filter 30 reaches zero, the phase margin of the system is determined at step 44. As previously noted, the phase margin is equal to the difference between the phase at the locations in the sine table 26 pointed to by $F_P$ PTR and SINE PTR. Thus, the phase of the output from the summing node 34 is expressed as follows:

$$\text{Phase} = \text{SINE PTR} - (F_P \text{PTR} - 90°) \quad (6)$$

and the phase margin of the system is expressed as:

$$\text{Phase Margin} = 180° - \text{Phase} \quad (7)$$

Coefficients of the transfer function associated with the compensator circuit 18 are adjusted at step 46 as previously described to bring the phase margin of the system within a desired range.

Thus, there has been described herein a control circuit and method for the continuous optimization of the phase margin of disk drives necessitated by changes in the specific operating conditions of each individual disk drive. The phase margin is automatically adjusted during actual operation of the disk drive. It will be understood that various changes in the details and arrangements of the implementation described herein will occur to those skilled in the art without departing from the principle and scope of the present invention. Thus, while the invention has been described with reference to the presently contemplated best mode for practicing the invention, it is intended that this invention only be limited by the scope of the appended claims.

The following program listing is a present preferred listing for the automatic phase margin compensation control circuit and method described above:

```
************************************************************
************************************************************
*
* Phase adjustment routine.
*
* L. Supino
*
* initialize the bode state to calibrate the servo phase margin
*
phaseini         equ          $

* zero the phase integral, intrgl.

zac
        sacl         intgrl

* reset the phase filter.

sacl         filter

* set the filtering time to 300ms (the sample rate is 20160 hz).

lrlk         ar4,3*2016

* set up to switch to the next state.

lalk         phase010
        sacl         state

* reset the track error integrator.

zac
        sacl         blierh
        sacl         blierl b            phasepid

*           ************************************************
*           **         filter to extract phase           **
*           ************************************************
*
* find the value of phase required to make filter equal to zero while the servo loop's input is being
* measured.

phase010

* errsig is the servo's error signal. it is the output of the p.i.d. compensator after the
* sinusoidal disturbances signal has been added in, but before the notch filters. in the
```

* world of an injection op-amp and a 3562, errsig is the output of the op-amp or the
* servo loop's input.

```
        lac       errsig,15 sach      signal
```

* the phase variable is adjusted to bring the filter variable to zero. the adjusting is
* accomplished with a servo loop. the filter output error is integrated into the phase
* offset. when the error goes to zero, the phase offset becomes constant. note: there
* are two values of phase which cause filter to go to zero. they are separated by 180
* degrees. only one of them is a stable value, it is the one that causes the phase
* offset disturbance to be 90 degrees ahead of the signal being measured.

```
*       ***************************************************
*       *     find the phase which makes the filter zero       *
*       ***************************************************
*
```

* there are two digital filters here. the first integrates the filter output error into
* intgrl.

* its transfer function is:
*
*       intgrl         $2^{-6}$
*       ------    =    ----------
*       filter         $1 - z^{-1}$

```
        zalh      intgrl
        add       filter,10
        sach      intgrl
```

* the second one puts a zero in the loop to provide loop stability. the overall transfer
* function from filter to phase is:
*
*       phase          $2^{-6}$
*       -----     =    ----------  + 1
*       filter         $1 - z^{-1}$

```
        lac       intgrl
        add       filter
        sacl      phase
```

```
*       ***************************************************
*       *     increment the feed-forward table's index        *
*       ***************************************************
*
```

* sinptr is used to index into a table of sinusoidal feed-forward, or disturbance,
* values. sinptr ranges between 0 and 32, 767. it is incremented once per interrupt,
* or 20160 times a second. the increment size is 893. this means there are 893 x

* 20160 = increment size is 893. this means there are 893 x 20160 = 18,002,900
* increments per second and the sinusoid is generated 18,002,900 / 32,768 = 550
* times a second, i.e. it's a 550 hz disturbance. the scaling of sinptr is 360 degrees
* per 32,768 bits or 1 radian per 5,215 bits.

```
phaseb02        lac         sinptr
                adlk        893             550 hz
```

* sinptr rolls over and starts again at 32,767, or 7fff hex.

```
                andk        >7fff
                sacl        sinptr
```

*       ***********************************************
*           * index into the table to find a new disturbance value    *
*       ***********************************************
*
* sintab is the beginning location of the disturbance table. sinptr is effectively divided
* by 2**10 and added to sintab to index into the disturbance table so a new
* disturbance value (fedfwd) can be read. sinptr must be divided by 2**10 because
* the table only has 32 entries.

```
                lac         sinptr,6
                sach        temp0
                lalk        sintab
                add         temp0
                tblr        f_bw
```

*       ***********************************************
*           *   index into the table with a phase offset              *
*       ***********************************************
*
* phase holds the output of a phase filter. it is a changing number, being adjusted to
* make filter equal zero. phase is added to the value of sinptr to offset into the
* sinusoidal disturbance table.

```
                lac         sinptr
                add         phase
                andk        >7fff
                sacl        pf_ptr
```

* fp_ptr, which is the sum of sinptr and the phase offset, are effectively divided by
* 2**10 and added to sintab to index into the table and read a phase shifted
* disturbance value.

```
                lac         fp_ptr,6
                sach        fp_ptr
                lalk        sintab
```

```
            add       fp_ptr
            tblr      fp
```

```
*       ************************************************
*       *  multiply the phase offset disturbance by the measured signal  *
*       ************************************************
*
* the fp value, which is the phase offset disturbance with frequency equal to 500 hz
* and amplitude equal to 127 bits peak, is loaded into the t register in preparation for
* multiplication by the signal signal.

lt        fp

* signal is half the servo loop's input, errsig.

mpy       signal

* the product is transferred to the accumulator.  what's so special about this product?
* one part of the product, the fp part, is the sinusoidal disturbance with a phase
* shift... it's a nice sinusoid.  describe it as:
*
*       127 bits + sine ( 2*pi*550*t + theta )

* signal is an imperfect servo signal.  it's mostly 550 hz, because we're driving the
* servo at 550 hz, but it's got a lot of other junk mixed in - there's harmonics and dc
* offset and... yuch.  you can think of signal as a vast collection of ugly sinusoids,
* with one at 550 hz that interests us.  now the product of two sinusoids at different
* frequencies has an average value of zero, but the product of two sinusoids at the
* same frequency has an average value which is usually not zero.  specifically it is
* equal to one half the product of the magnitude of the two sinusoids times the cosine
* of the phase angle between the signals.  so we can think of the average value of the
* product which is about to go into the accumulator as:
*
*       1/2 * 127 bits * signal's amplitude *[ cos(a-b) - cos(a+b) ]

pac

*       ************************************************
*       *    lowpass filter the product to find an average value      *
*       ************************************************
*
* now that we have the product we have to estimate its average value by low-pass
* filtering it.  save the product in temp0 and retrieve the filter value into the high
* word of the accumulator, which is like multiplying the value by 2**16.  next
* subtract the filter value scaled up by 2**6, then add in the product of the sinusoids
* scaled up by 2**8 and finally store the high accumulator, which is like dividing the
* result by 2**16, back into the filter value.  this of course is a digital filter.  its
* transfer function is:
*
```

```
*       filter              2**-8
*       ———————  =  ———————————————————
*       product         1 - ( 1 - 2**-10 ) * z**-1 sacl        temp0
        zalh        filter
        sub         filter,6
        add         temp0,8
        sach        filter
```

* each filter is executed for 300 milliseconds.  auxillary register 4 is used to time the
* filtering operations. if the filter operation hasn't completed, execution moves to
* phaseb0a where the p.i.d. compensation is calculated for track following.

```
        larp        ar4
        banz        phaseb0a,*-,1
```

* the phase at which filter goes to zero has just been measured.

* now phase margin    = 180deg - [sinptr - (fp_ptr-90deg)]
*                     = 90 deg - sinptr + fp_ptr

```
        lalk        1,13                load 90 deg
        sub         sinptr
        add         fp_ptr              the acc now holds the phase margin
        neg
        adlk        1,12                the desired phase margin is 45 deg
        sacl        phase_margin_adjust save the phase adjust
        b           phaseb06 phaseb08
        lalk        phase020
        sacl        state
```

* calculate the p.i.d. compensation for track following.

```
        b           phaseb0a
```

```
*       ***************************************************
*       *      calculate the compensator coefficients      *
*       ***************************************************
``` phase020

* point to data structure containing the coefficients to adjust

```
        lalk        fmembs+anend
        sacl        temp2
```

* this is the coefficient generator

* the coefficients are generated by using a matrix-x curve fit program.
*
* an0 = a00 + a01*x + a02*x**2
*
* an1 = a10 + a11*x + a12*x**2
*
* an2 = a20 + a21*x + a22*x**2
*
* bn2 = an0+an1-4096
*
* bn1 = an1

```
adn010  larp        arl
        lar         arl,temp2
        lt          phase_margin_adjust    get x*4096
        mpy         phase_margin_adjust
        pac
        adlk        1,11
        sach        temp0,4                (x**2)*4096
        lt          temp0
        mpy         *-
        pac
        adlk        1,11
        sach        temp0,4                ay2*(x**2) where y = 0,1,2
        lt          phase_margin_adjust
        mpy         *-
        pac
        adlk        1,11
        sach        tempx1,4               ay1*x
        lac         temp0
        add         tempx1
        add         *-
        sacl        *-                     ay0 + ay1x + ay2*x**2
```

* save the data structure pointer

```
        sar         arl,temp2
        lalk        fmembs+anstrt          load start of data structure
        sub         temp2                  are we done?
        blz         phaseb0a               if lz, no keep on going
```

* now move the computed coefficients into coefficient memory

```
adn020  cnfd
        larp        arl
        lrlk        arl,lco2fbs+leada2     point to the notch coefficient memory
        lac         an2                    a2
```

```
        sacl        *+
        lac         an1         a1
        sacl        *+
        lac         an0         a0
        sacl        *+
        lalk        4096
        sub         an0
        sub         an2
        sacl        *+          -b2
        lac         an1
        neg
        sacl        *           -b1
        cnfp
```

```
*       ***********************************************************
*               *       exit the phase calibration routine         *
*       ***********************************************************
*
```

* after the gain calibration routine completes, the actuator is moved to cylinder zero.

```
        lalk        pidtke
        sacl        state
```

```
*       ***********************************************************
*               *       calculate the p.i.d. compensation          *
*       ***********************************************************
*
```

* the following group of instructions are the servo's p.i.d. compensator used while
* track following.

phaseb0a

* sine is summed with the compensation and the result is stored for output to the
* power amp at pa$cmd and for use in the gain calibration algorithm at errsig.

* p.i.d._dedicated_tracking_state executes the following:
*
*       $g(z) = (1.126*z**2 - 2.125*z + 1)/(z**2 - z)$
*
* where kp = .125, kint = 2**(-10), kd = 1
* generate compensation command: part_1_derivative phasepid call fstvel           execute dedicated_position_tach_routine

* generate compensation command: part_2_proportional

```
        lac pse201,13   [acc] = position_error * proportional_channel_gain(kp) =
                        scaled_velocity_command
```

```
        sach prperh        [ prperh ] = position_based_velocity_command_( high_order )
        sacl prperl        [ prperl ] = position_based_velocity_command_( low_order )
```

* generate compensation command: part_3_integral

```
        zahl blierh        update integrator and run p.i.d. loop
        adds blierl        [ acc ] = 32_bit_integrated_position_error
```

* the following instruction has the effect of: kint * position
* where kint =2(-10) = 2 (n-16) where n = 6

```
        add pse201,6  increment integrator by scaled_position_error
        sach blierh   save 32_bit_integrated_position_error
        sacl blierl
```

* form compensation command from p.i.d._position or p.d._position

```
        adds prperl
        addh prperh   [ acc ] = 32_bit_p.i._position_error
```

* the following instruction has the effect of: kd * d(position)/dt where kd = 1. for
* fractional kd, a second instruction can be added of the for "add vel202,n" where n
* = 0 to 15. n+15 generates kd to change by* 0.5 = 2(**-1).

```
        addh vel201   [ acc ] = 32_bit_p.i.d._position_error
        add sine,12   add in the sine disturbance at 1/16 ampl
        sach errsig
        sach velcmd
```

* run settle_loop_resonance_compensation

```
        call stlrte   invoke prepared_error_settle_routine entry point ( lead only )
*
        b    sekwat
```

```
*       ********************************************************
*       *         the table of feed-forward (sine) values       *
*       ******************************************************** sintab  data   25
        data   49
        data   71
        data   90
        data   106
        data   117
        data   125
        data   127
        data   125
```

```
data    117
data    106
data    90
data    71
data    49
data    25
data    0
data    -25
data    -49
data    -71
data    -90
data    -106
data    -117
data    -125
data    -127
data    -117
data    -106
data    -90
data    -71
data    -49
data    -25
data    0
```

What is claimed is:

1. A method for automatically controlling a phase margin of a disk drive system having a head disk assembly with an actuator, a head driven by said actuator, and a compensator means for controlling the movement of said actuator, said method comprising:
  (a) generating a position signal from said head disk assembly;
  (b) generating a position error signal using said position signal and a reference signal;
  (c) generating a disturbance signal having a predetermined frequency;
  (d) combining said disturbance signal and said position error signal to form a combined signal;
  (e) applying said combined signal to said compensator means to generate a control signal;
  (f) applying said control signal to said head disk assembly to control the movement of said actuator;
  (g) determining said phase margin of said disk drive system, said step of determining said phase margin comprising:
    (i) generating a first measurement signal that is advanced in phase with respect to said disturbance signal;
    (ii) combining said first measurement signal with said position error signal to form a second measurement signal having a frequency component of said predetermined frequency;
    (iii) evaluating a phase difference between said frequency component of said second measurement signal and said disturbance signal to determine whether said phase margin of said system is measurable;
    (iv) iteratively altering the phase relationship between said disturbance signal and said first measurement signal when said phase difference indicates that said phase margin of said system is not measurable; and
    (v) measuring said phase margin of said system when said phase difference indicates that said phase margin is measurable; and
  (h) adjusting said phase margin of said system in response to the determination of said phase margin.

2. The method for automatically controlling the phase margin of a disk drive system according to claim 1, wherein said disturbance signal is generated from a sine table stored in a memory device.

3. The method for automatically controlling the phase margin of a disk drive system according to claim 1, wherein said compensator circuit has a transfer function expressed mathematically in terms of at least one coefficient, said step of modifying said control signal comprises the step of modifying said at least one coefficient in response to the determination of the phase margin of the disk drive system to alter the phase margin of the system.

4. The method for automatically controlling the phase margin of a disk drive system according to claim 3, wherein said step of modifying said at least one coefficient comprises the steps of:
  establishing the relationship between said at least one coefficient and the phase margin of said disk drive system; and
  altering the value of said one coefficient based on said relationship.

5. The method for automatically controlling the phase margin of a disk drive system according to claim 4, wherein said step of establishing the relationship comprises the step of measuring empirical data from a plurality of disk drives.

6. An apparatus for automatically controlling a phase margin of a disk drive system having a head disk assembly with an actuator, a head driven by said actuator, and a compensator means for controlling the movement of said actuator, comprising:

(a) means for generating a position signal from said head disk assembly;

(b) means for generating a position error signal using said position signal and a reference signal;

(c) means for generating a disturbance signal having a predetermined frequency;

(d) means for combining said disturbance signal and said position error signal to form a combined signal;

(e) means for applying said combined signal to said compensator means to generate a control signal;

(f) means for applying said control signal to said head disk assembly to control the movement of said actuator;

(g) means for determining said phase margin of said disk drive system, said step of determining said phase margin comprising:

(i) means for generating a first measurement signal that is advanced in phase with respect to said disturbance signal;

(ii) means for combining said first measurement signal with said position error signal to form a second measurement signal having a frequency component of said predetermined frequency;

(iii) means for evaluating a phase difference between said frequency component of said second measurement signal and said disturbance signal to determine whether said phase margin of said system is measurable;

(iv) means for iteratively altering the phase relationship between said disturbance signal and said first measurement signal when said phase difference indicates that said phase margin of said system is measurable; and (v) means for measuring said phase margin of said system when said phase difference indicates that said phase margin is measurable; and (h) means for adjusting said phase margin of said system in response to the determination of said phase margin.

7. The apparatus for automatically controlling the phase margin of a disk drive system according to claim 6, wherein said means for generating said disturbance signal comprises a sine table stored in a memory device.

8. The apparatus for automatically controlling the phase margin of a disk drive system according to claim 6, wherein said compensator circuit has a transfer function expressed mathematically in terms of at least one coefficient, said means for modifying said control signal comprises means for modifying said at least one coefficient in response to the determination of the phase margin of the disk drive system to alter the phase margin of the system.

9. The apparatus for automatically controlling the phase margin of a disk drive system according to claim 8, wherein said means for modifying said at least one coefficient comprises:

means for establishing the relationship between said at least one coefficient and the phase margin of said disk drive system; and means for altering the value of said one coefficient based on said relationship.

* * * * *